United States Patent [19]

Fleury, Jr.

[11] 3,937,317
[45] Feb. 10, 1976

[54] COMPONENTS FOR WEAR-RESISTANT SURFACING HELICAL METAL CONVEYOR BLADES AND THE SO SURFACED BLADES
[75] Inventor: Leo W. Fleury, Jr., Woonsocket, R.I.
[73] Assignee: Bird Machine Company, Inc., South Walpole, Mass.
[22] Filed: Jan. 2, 1975
[21] Appl. No.: 538,126

[52] U.S. Cl. .................. 198/213; 233/7; 403/355; 403/381
[51] Int. Cl.² ........................................ B65G 33/00
[58] Field of Search ............ 198/213; 209/451, 452; 210/369, 374; 233/7; 403/316, 355, 367, 380, 381, 356, 358

[56] References Cited
UNITED STATES PATENTS
| | | | |
|---|---|---|---|
| 3,090,086 | 5/1963 | Fata | 403/381 |
| 3,216,219 | 11/1965 | Hoglund | 403/380 |
| 3,762,537 | 10/1973 | Lutz | 198/213 |
| 3,764,062 | 10/1973 | Brautigam | 233/7 |

FOREIGN PATENTS OR APPLICATIONS
| | | | |
|---|---|---|---|
| 36,323 | 1/1906 | Switzerland | 198/213 |

Primary Examiner—Evon C. Blunk
Assistant Examiner—Joseph E. Valenza
Attorney, Agent, or Firm—Edgar H. Kent

[57] ABSTRACT

Components for wear-resistant surfacing helical metal conveyor blades have segments of wear-resistant material of like shape conforming to the helix curvature for mounting in side-by-side relation on a face of the blade. The segments have at least one slot which extends through their inner end and diagonally across the segment toward its outer end. A bar is provided for insertion in each groove with its end projecting from the inner end of the groove, the projecting bar ends being welded to the blade face to prevent movement of the segments relative to the blade.

7 Claims, 4 Drawing Figures

COMPONENTS FOR WEAR-RESISTANT SURFACING HELICAL METAL CONVEYOR BLADES AND THE SO SURFACED BLADES

BACKGROUND OF THE INVENTION

1. Field of the Invention

This invention relates to components for wear-resistant surfacing of metal screw conveyors, particularly conveyors of centrifuges, and to such conveyors surfaced therewith.

2. Description of the Prior Art

U.S. patent application of Elwin Lewoczko, Ser. No. 533,198, filed Dec. 16, 1974, assigned to the assignee of the present application, discloses a screw conveyor for centrifuges in which segments of wear-resistant surfacing material are secured to a helical metal stub blade against radial outward and axial movements under high centrifugal forces, by slidably interlocked mating parts on the segments and the blades. The conveyor of the aforesaid application is a substantial improvement over wear-resistant surfaced conveyors of the prior art in both retention of the segments under high centrifugal forces and ease of replacement of worn segments in the field.

However, the embodiment of the invention disclosed in the aforesaid application utilizes a wedge-shaped projection on the blade face of the segments and wedge-shaped pieces on the blade as the mating parts which form a dovetail joint when the segment is slid radially outwardly on the blade to wedge the projection edges under the edges of the wedge-shaped pieces. In this arrangement, disassembly of a worn segment requires that it be slid radially inwardly to disengage the mating parts, which would not be possible as to any segment between others if all segments had the usual shape, diminishing in width from outer to inner ends to compensate for the diminishing radius of curvature of the helix toward their inner ends. The arrangement of the aforesaid application makes such disassembly possible by providing two different shapes of segments which are used in alternation, which works satisfactorily but complicates somewhat the molding of segments, their assembly to the conveyor and the stocking of spare parts.

SUMMARY OF THE INVENTION

The object of this invention is to provide components for surfacing metal screw conveyors with wear-resistant material and such conveyors surfaced therewith which have advantages similar to those of the disclosed embodiment of the aforesaid application, but which do not have the disadvantage of requiring different segment shapes for ready removal and replacement.

In attaining the foregoing object, this invention provides segments of uniform wedge shape for side-by-side attachment to a face of a helical conveyor stub blade, each segment having a widthwise and outer end curvature conforming to that of the helix. Each segment is provided with at least one groove extending diagonally across the segment from the inner toward the outer end of the segment. Each segment is also provided with a weldable metal bar for each of its said grooves which fits slidably in the groove, both the grooves and the bars being of a complementary shape which provides segment wall structure between each bar and each face of the segment.

The bars are sufficiently long to protrude beyond the inner ends of the segments and the segments are secured to the conveyor stub blade by welding these protruding bar ends to the face of the blade. Once the bar ends are welded, the segments are locked by the bars from movement either radially or axially relative to the helical stub blade. To replace worn segments in the field, the welds of each bar of segments to be replaced may be chipped off and the segments can then be pulled away from the blade either radially or forwardly. New segments are substituted and the protruding ends of their bars are welded to the blade face.

In a preferred embodiment each segment is provided with two of said grooves and bars, the grooves being oppositely angled so that they are closer together at one end than at the other. Preferably also the grooves extend through both the radially inner and outer ends of the segments, they open through the inner face of the segment which is attached to the blade, and they are of increasing width from that face toward the opposite face.

DESCRIPTION OF THE PREFERRED EMBODIMENT

Figure 1:
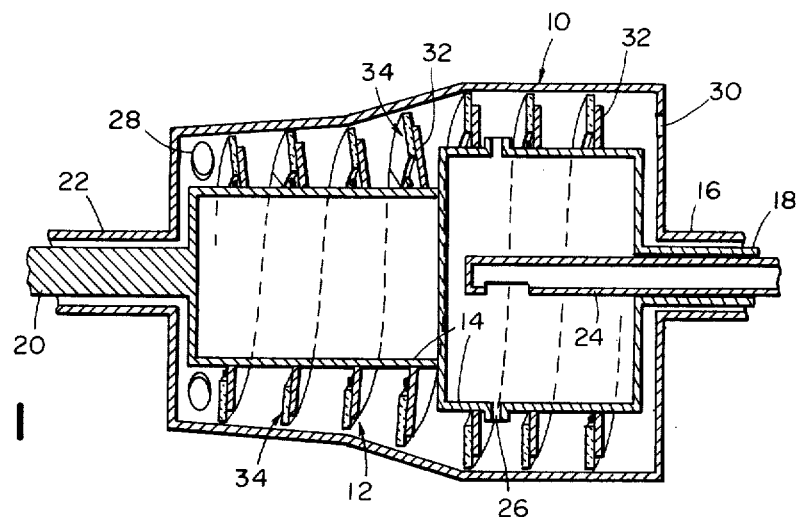
FIG. 1 is a partial longitudinal cross-section view, somewhat simplified, of a centrifuge and conveyor assembly, the conveyor being formed of a helical blade having hard-surfacing components assembled thereto according to the invention.

Wear-resistant surfaced screw conveyors according to the invention are particularly useful in liquid-solid separating centrifuges which develop high centrifugal forces, such as solid bowl and perforate bowl continuous centrifuges, and combinations of the two. In FIG. 1, the conveyor is shown as that of a conventional solid bowl centrifuge, the bowl being designated generally 10 surrounding the conveyor designated generally 12 mounted on a hollow hub 14. As is common, bowl 10 is cylindrical at one end and of frusto-conical diminishing cross-section at the other end, in this case there being an intermediate frusto-conical section of larger cone angle between the two. The bowl is rotated by means of a hollow shaft 16 at the cylindrical end, the drive connections (not shown) including support bearings and drive sheave and belt connections to a motor. The conveyor hub has at one end a hollow shaft 18 extending into shaft 16 and received in bearings (not shown), and at the other end has a shaft 20 extending through hollow shaft 22 on the bowl to differential drive connections (not shown) by which it is rotated in the same direction as the bowl at a small differential speed.

The feed slurry enters hub 14 through feed pipe 24 extending through shaft 18 and discharging into a feed compartment in the hub which in turn discharges the slurry to the bowl through ports 26. The solids settling in the bowl under centrifugal force are moved by the conveyor to the smaller end of the bowl where they are discharged through ports 28 into a receiving compartment or chute in a stationary casing (not shown) surrounding the bowl. The liquid effluent is discharged from the bowl into the casing through ports 30 in the cylindrical end bowl head.

The conveyor 12 is made up of a helically pitched metal stub blade 32 welded to conveyor hub 14, the blade having larger than desired clearance from the surrounding bowl wall and, secured to the front face of blade 32, an assembly of wearresistant surfacing components according to the invention to form the working area of the conveyor at the desired clearance from the bowl. The conveyor is shown as a single composite blade which is completely formed of the composite of stub blade and segments. However, more than one composite conveyor blade may be used, and the composite blade structure of the invention may be used for only the part or parts of the conveyor blade or blades where high abrasive wear is experienced (e.g. toward the solids discharge end).

Figure 2:
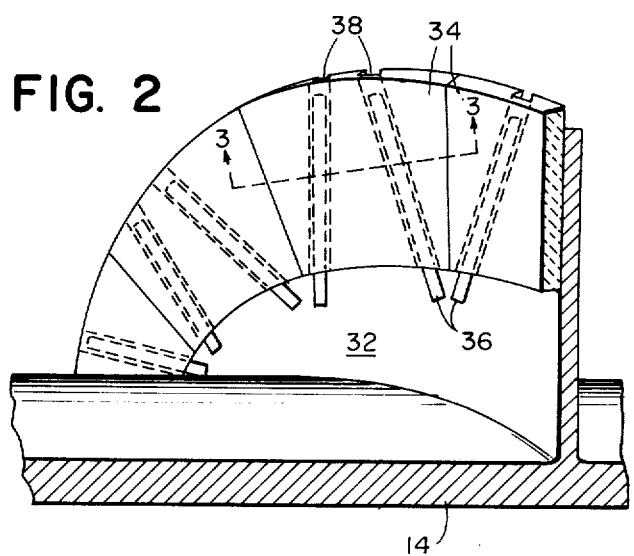
FIG. 2 is a view partially in longitudinal section, partially in elevation, of a part of the conveyor shown in FIG. 1.
Figure 4:
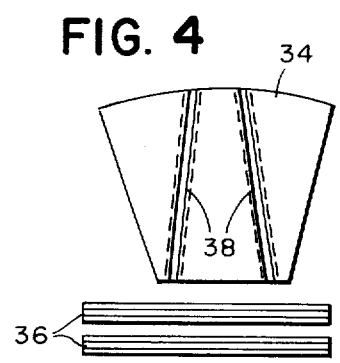
FIG. 4 is a rear plan view of a segment and attachment bars used in the assembly of the conveyor.
Figure 3:
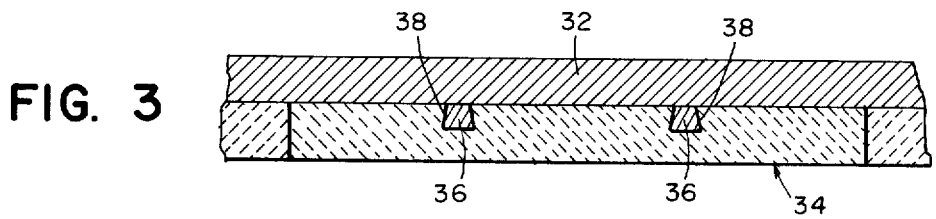
FIG. 3 is a somewhat enlarged cross-section view on line 3—3 of FIG. 2, looking in the direction of the arrows.

The components of the wear-resistant surfacing assembly shown in detail in FIGS. 2–4, consist of segments 34 of like shape of wear-resistant material and a pair of metal bars 36 for each segment which are inserted in grooves 38 in the segment and welded to the front face of stub blade 32 to fasten the segment to the blade. Segments 34, which are preferably molded of a very hard ceramic material, are curved widthwise in conformity with the helical curvature of blade 32. The outer ends of the segments are curved about the axis of helical blade 32 at a radius which provides the desired clearance from bowl 10 when the segments are assembled to the blade. The segments are of like diminishing width from their radially outer to their radially inner ends.

Grooves 38 are shown as extending diagonally across the segments from the inner end to the outer end thereof and through these ends, although it is not necessary that they extend through the outer ends. The grooves are also shown as opening through the face of the segments which is attached to blade 32 (see FIGS. 3 and 4). They are oppositely angled so that their outer ends are closer together than their inner ends, and they are of wedge-shaped cross-section which widens toward the outer face of the segment. The depth of the grooves is such as to leave adequate thickness, for strength, of material between them and the front face of the segment.

Bars 36 are of corresponding cross-sectional shape to grooves 38 and slightly smaller as shown, so that they may be slid endwise into the grooves with their narrower surface at the narrower part of the groove. Their length is such that when inserted in the grooves to a desired extent, preferably as shown with their outer ends inside but in close proximity to the outer ends of the grooves, their inner ends project beyond the inner end of the segment. The so projecting end portions of bars 36 are provided for welding the bars to the blade 32.

In initially assembling the hard-surfacing components to blade 32, the segments 34, with bars 36 inserted in grooves 38, are successively positioned on the outer part of the front face of the blade with their sides abutting and their outer ends aligned and projecting a desired distance beyond the outer end of the blade. Preliminary to this operation it may usually be desirable to apply a thin coating of a filler (not shown) to one or both of the opposing surfaces of the blade and the segments to compensate for irregularities in these surfaces and provide a snug fit. If the filler is an adhesive such as epoxy adhesive, the surfaces to be coated therewith and the bars 36 should be coated with a mold release to prevent bonding of the adhesive thereto which would make removal of worn segments for replacement undesirably difficult.

After locating a segment and the filler is set if one is used, the projecting inner ends of bars 36 are welded to blade 32, as by fillet welding around the end. Once the bars are welded the segments are firmly fixed to the blade against movement in any direction. This is because the complementary shape of the bars 36 and grooves 38 permits relative movement of the bars and segments only axially of the grooves and, due to the angularity of the bars and grooves, such movement is no longer possible after the bars are welded. It will be noted that a similar effect would be obtained if the grooves were oppositely angled so that their inner ends are closer together. The arrangement shown is preferred, however, since it is better resistant to stresses under high centrifugal forces.

When it is desired to replace worn segments, this can readily be done in the field. The welds of the attachment bars of the worn segments are broken by chipping or prying and the segment can then be pulled off the blade either radially or axially. New segments and bars are then attached in the manner previously described.

Having the grooves 38 open through the inner face of the segments as shown is a desirable feature, both because it permits bars 36 to be substantially flush with the face of blade 32 throughout their length, and because, for a given thickness of material and size of grooves and bars, it provides more wall thickness between the groove and the front working face of the segment. Having the grooves extend through the outer ends of the segments instead of close to them is for convenience, both in molding the segments and in permitting insertion of the bars in the grooves from either end of the grooves.

As previously indicated, it is contemplated that each segment may be provided with only one groove 38 and mating bar 36, in which case the single groove would be more nearly centered on the center radius of the segment. Welding of the projecting bar end to the stub blade retains the blade against movement in any direction away from the stub blade as in the case of the two slots and bars of the illustrated embodiment. However, the two slot and bar embodiment is preferred for better retention security under the forces involved in operation of the conveyor. I claim:

1. Components for wear-resistant surfacing helical metal conveyor blades comprising:

a segment of wear-resistant surfacing material adapted for attachment in side-by-side relation with other like segments to a face of said blade to form a conveying portion thereof, said segment having a widthwise and radially outer end curvature conforming to that of the helix and diminishing in width from its outer end toward its inner end;

said segment having therein at least one groove extending through the inner end thereof and diagonally across the segment toward the outer end thereof;

and a bar of weldable metal for each said groove slidably fitting in the groove and of sufficient length to provide an end portion protruding from the inner end of said segment for welding to a face of said stub blade;

each said groove and bar having a complementary shape such as to prevent relative movement thereof in directions other than axially of said groove.

2. Components according to claim 1 wherein said segment has two of said grooves and bars, said grooves being oppositely angled so that they are closer together at one of their ends than at the other.

3. Components according to claim 2 wherein said grooves are closer together at their outer ends.

4. Components according to claim 1 wherein each said groove opens through the face of said segment to be attached to said blade, is closed to the opposite face of said segment, and is of increasing cross-section toward the opposite face of said segment.

5. Components according to claim 1 wherein each said groove and said bar when positioned therein have their outer ends in the region of the radially outer end of said segment.

6. A hard-surfaced screw conveyor comprising:

a helical metal conveyor blade and a plurality of the components according to claim 1 mounted on the radially outer portion of a face of said blade with the segments thereof in side-by-side relation and with the projecting portions of said bars in said grooves of said segments welded to said blade face.

7. A conveyor according to claim 6 wherein said segments project beyond the radially outer ends of said blade.

* * * * *